(12) United States Patent  
Maenle et al.

(10) Patent No.: US 8,960,512 B2  
(45) Date of Patent: Feb. 24, 2015

(54) CAST BACK CLAMP AND MOUNTING COMPONENT

(75) Inventors: William C. Maenle, Ottoville, OH (US); John Garberson, Columbus Grove, OH (US); Tom Steffan, Cloverdale, OH (US); David Richard Smith, Fort Jennings, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 463 days.

(21) Appl. No.: 13/230,567

(22) Filed: Sep. 12, 2011

(65) Prior Publication Data

US 2013/0062380 A1    Mar. 14, 2013

(51) Int. Cl.
*B60R 9/00* (2006.01)
*A01B 23/02* (2006.01)
*F16B 2/06* (2006.01)

(52) U.S. Cl.
CPC . *A01B 23/02* (2013.01); *B60R 9/00* (2013.01); *F16B 2/065* (2013.01)
USPC ....... 224/410; 224/545; 224/558; 248/229.14

(58) Field of Classification Search
USPC ......... 224/401, 512, 514, 515, 448, 545, 555, 224/558; 248/229.1, 230.1, 229.14, 226.11, 248/227.3, 228.1, 228.5, 689, 274.1, 205.1; 403/3; 267/52; 280/460.1, 461.1
See application file for complete search history.

(56) References Cited

U.S. PATENT DOCUMENTS

| | | | | |
|---|---|---|---|---|
| 3,631,929 A * | 1/1972 | Gates | ............. | 172/643 |
| 3,799,079 A * | 3/1974 | Dietrich | ............. | 111/123 |
| 3,910,624 A * | 10/1975 | Becker | ............. | 410/81 |
| 4,579,179 A * | 4/1986 | Vachon | ............. | 172/395 |
| 4,677,787 A * | 7/1987 | Said | ............. | 47/1.5 |
| 4,781,129 A * | 11/1988 | Swanson et al. | ............. | 111/167 |
| 5,361,848 A * | 11/1994 | Fleischer et al. | ............. | 172/140 |
| 5,632,567 A * | 5/1997 | Lowe et al. | ............. | 403/3 |
| 5,762,436 A * | 6/1998 | Mosdal | ............. | 403/3 |
| 5,785,460 A * | 7/1998 | Noonan et al. | ............. | 403/388 |
| 6,474,522 B1 * | 11/2002 | Johnson | ............. | 224/515 |
| 7,434,775 B2 * | 10/2008 | Wilcox | ............. | 248/228.1 |
| 2013/0025515 A1 * | 1/2013 | Kuebler et al. | ............. | 111/118 |

* cited by examiner

*Primary Examiner* — Justin Larson
(74) *Attorney, Agent, or Firm* — Rothwell, Figg, Ernst & Manbeck, P.C.

(57) ABSTRACT

A mounting device for mounting a component onto a farm implement having a frame, includes a clamp member and a mounting component. The clamp member includes a top section, a bottom section and a connecting member coupled to the top section at a first end portion and the bottom section at a second end portion. The top section is configured to engage two adjacent surfaces of a support element, and the bottom section is configured to engage two adjacent surfaces of a support element. A length of the connecting member between the top section of the clamp member and the bottom section of the clamp member is adjustable. The top section includes at least one receiving member, and the bottom section includes at least one receiving member. The mounting component includes a plurality of receiving members. Each mounting member is configured to engage the mounting hole of the clamp end portion and a mounting hole of the mounting component.

18 Claims, 6 Drawing Sheets

CAST BACK CLAMP AND MOUNTING COMPONENT

BACKGROUND OF THE INVENTION

1. Field of the Invention

The present invention relates generally to a mounting device for a farm implement. More particularly, the present invention relates to a clamp designed to match the profile of the structure upon which it is secured, for firmly mounting a component without requiring large amounts of space. For example, in the farming industry, it is common to mount components on the frame of a farm implement.

2. Description of the Related Art

Mounting devices have been designed for ease of assembly and for strength. Mounting devices designed for ease of assembly include hardware designed to fit approximately around the mounting tube. Such mounting devices are prone to movement because the torque of the mounting hardware is not sufficient to support the load applied to the mounting devices.

Mounting devices designed for strength typically require more hardware and closer tolerances. The assembly process for securing such mounting devices can be tedious and time consuming due to the extra hardware and closer tolerances. Further, such mounting devices usually occupy more space because of the extra hardware, so they cannot be used when space is a factor.

Thus there is a need for a new and improved device for mounting a component to a mounting tube.

SUMMARY OF THE INVENTION

According to an embodiment of the present invention, a mounting device for mounting a component onto a farm implement having a frame includes a clamp member including a top section, a bottom section and a connecting member coupled to the top section at a first end portion and the bottom section at a second end portion. The top section is configured to engage two adjacent surfaces of a support element, and the bottom section is configured to engage two adjacent surfaces of a support element. A length of the connecting member between the top section of the clamp member and the bottom section of the clamp member is adjustable. The top section includes at least one receiving member, and the bottom section includes at least one receiving member. The mounting device also includes a mounting component including a plurality of receiving members, and the mounting device includes a plurality of mounting members. Each mounting member is configured to engage the mounting hole of the clamp end portion and a mounting hole of the mounting component.

According to another embodiment of the present invention, the top section of the clamp member and the bottom section of the clamp member each include a retaining receiving member. According to another embodiment of the present invention, the connecting member is configured to engage the retaining receiving members. According to another embodiment of the present invention, the top section of the clamp member and the bottom section of the clamp member are each capable of being coupled to the connecting member at a plurality of locations on the connecting member such that a distance between the top section and the bottom section is adjustable.

According to another embodiment of the present invention, the receiving members of the top section and the bottom section of the clamp member are configured to allow the mounting members to contact a surface of a support member. According to another embodiment of the present invention, each clamp member is approximately I-shaped.

According to another embodiment of the present invention, each of the plurality of receiving members of the mounting component is a hole.

According to another embodiment of the present invention, each mounting member includes a head, a body portion, and a threaded portion, and each mounting member is configured to engage the mounting hole of the clamp end portion and the mounting hole of the mounting component with the body.

According to an embodiment of the present invention, a mounting device mounting a bracket to a support member includes a clamp including two L-shaped end portions, each L-shaped end portion including an inner angle coupled to the support member, and each of the end portions includes at least one receiving member. A length of the clamp is adjustable. The mounting device also includes a mounting component including a plurality of mounting receiving members and a plurality of mounting members coupling the clamp to the mounting component. Each mounting member is configured to engage a receiving member of the clamp and a mounting receiving member of the mounting component.

According to another embodiment of the present invention, each of the clamp end portions include a retaining hole. According to another embodiment of the present invention, the mounting device includes a retaining member configured to engage the retaining holes and couple the at least two clamp end portions together. According to another embodiment of the present invention, the clamp end portions are capable of being coupled to the retaining member at a plurality of locations on the retaining member such that a distance between the end portions is adjustable.

According to another embodiment of the present invention, the mounting holes of the clamp are configured to allow the mounting members to contact a surface of a support member.

According to another embodiment of the present invention, each of the clamp end portions are configured to couple with two adjacent surfaces of the support member.

According to an embodiment of the present invention, a system for mounting a component to a support member with at least three surfaces includes means for clamping configured to couple with three surfaces of the support member. The system also includes means for adjusting a length of said means for clamping and means for mounting a component. The system further includes means for coupling the means for clamping to the means for mounting a component.

According to another embodiment of the present invention, the means for clamping includes two ends and a means for coupling the two ends. According to another embodiment of the present invention, the system also includes a means for adjusting a length of the means for coupling the two ends.

According to an embodiment of present invention, a cast back clamp that matches the profile of the mounting tube can be provided. This clamp can be fabricated, or cast in shape and adapted to match the profile of the structure to which it will be mounted (e.g., frame element, tube, etc.) and to allow the mounting components to set firmly against the mounting frame, thus eliminating the issues associated with other types of mount clamping. The cast back clamp has an included inside angle of 90 degrees or less, allowing the clamp to fully contact the mounting member at all mating surfaces, and eliminate bending and deflection of the clamp components.

Because of the position and location of the holes in the mounting bracket, the bolts can act as a wedge onto the mounting tube, thus eliminating clearances that are normally associated with other types of mounts. This wedge effect allows the mounting bolts to fully contact the mounting member, along the entire bolt length. The back cast clamp retaining bolt is used as another component and serves to tighten all clamp components together to ensure the clamp remains firmly seated and wedge onto the mounting tube.

According to one embodiment of the invention, the cast back clamp can be kept narrow in width to allow mounting in areas with limited clearances.

An additional feature of this mounting arrangement is the mounting bolt's full body diameter extends fully through the base plate of the mounting bracket. Spacer tubes provide the additional length required to allow the bolt's body to extend fully through the mounting plates thus eliminating bending in the thread area of the bolts when a load is applied. This extended body eliminates the inherent weakness associated with a bolt when a bending load is applied to its thread area.

The above and/or other aspects, features and/or advantages of various embodiments will be further appreciated in view of the following description in conjunction with the accompanying figures. Various embodiments can include or exclude different aspects, features or advantages where applicable. In addition, various embodiments can combine one or more aspects, features, or advantages where applicable. The descriptions of the aspects, features, or advantages of a particular embodiment should not be construed as limiting any other embodiment of the claimed invention.

DETAILED DESCRIPTION OF THE DRAWINGS

While the present invention may be embodied in many different forms, a number of illustrative embodiments are described herein with the understanding that the present disclosure is to be considered as providing examples of the principles of the invention and such examples are not intended to limit the invention to the preferred embodiments described herein and/or illustrated herein.

Figure 3:
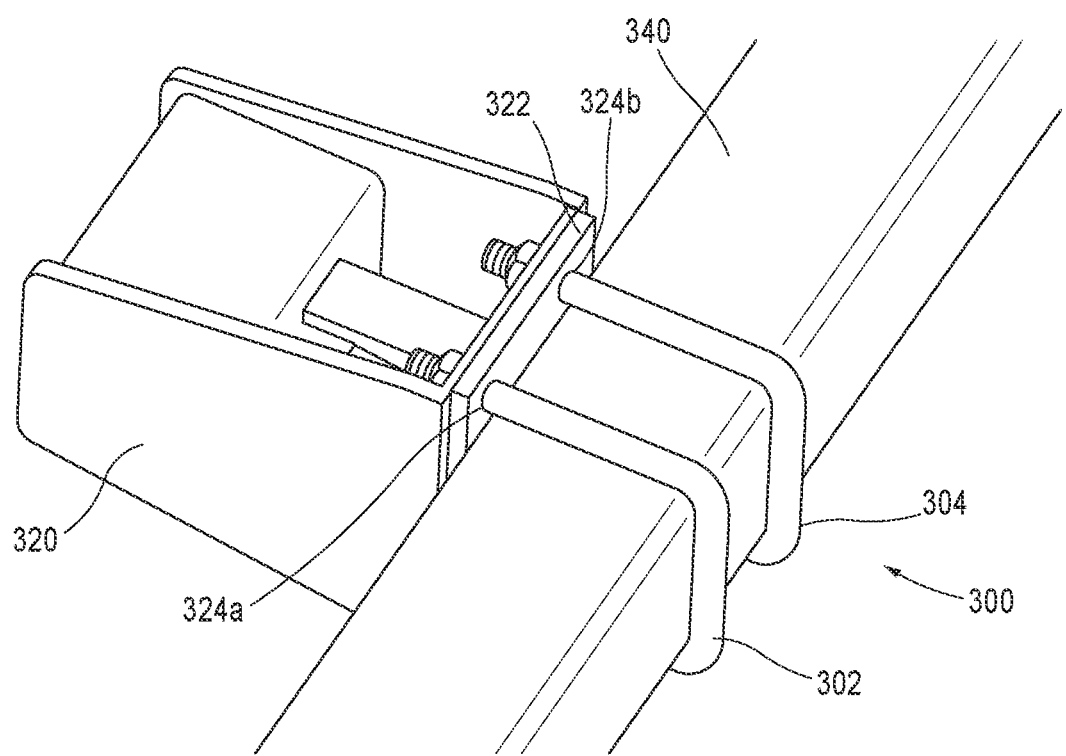
FIG. 3 is a perspective view of a device for mounting a component to a mounting element.

FIG. 3 illustrates a clamp 300 and a bracket 320 according to a previous design concept. The clamp 300 is U-bolts 302 and 304 designed to approximately fit around a mounting tube 340. In order to fit the profile of the mounting tube 340, clearances are built into the U-bolts 302 and 304 that allow the U-bolts 302 and 304 to slide over the mounting tube 340 during assembly. The bracket 320 includes a base plate 322 including a plurality of mounting holes 324a-b. Clearances are built into the base plate 322 of the bracket 320 that allow the U-bolts 302 and 304 to align into the mounting holes 324a-d with minimal effort. This design requires the inside radius of the U-bolts 302 and 304 to match the corner radius of the mounting tube 340. However, it was found that the U-bolts 302 and 304 are highly stressed at the corners because of the small corner radiuses required to match the corner radius of the mounting tube 340. The U-bolts 302 and 304 are prone to movement and breakage when a load is applied to them because of the mounting and fitment requirements.

Figure 4:
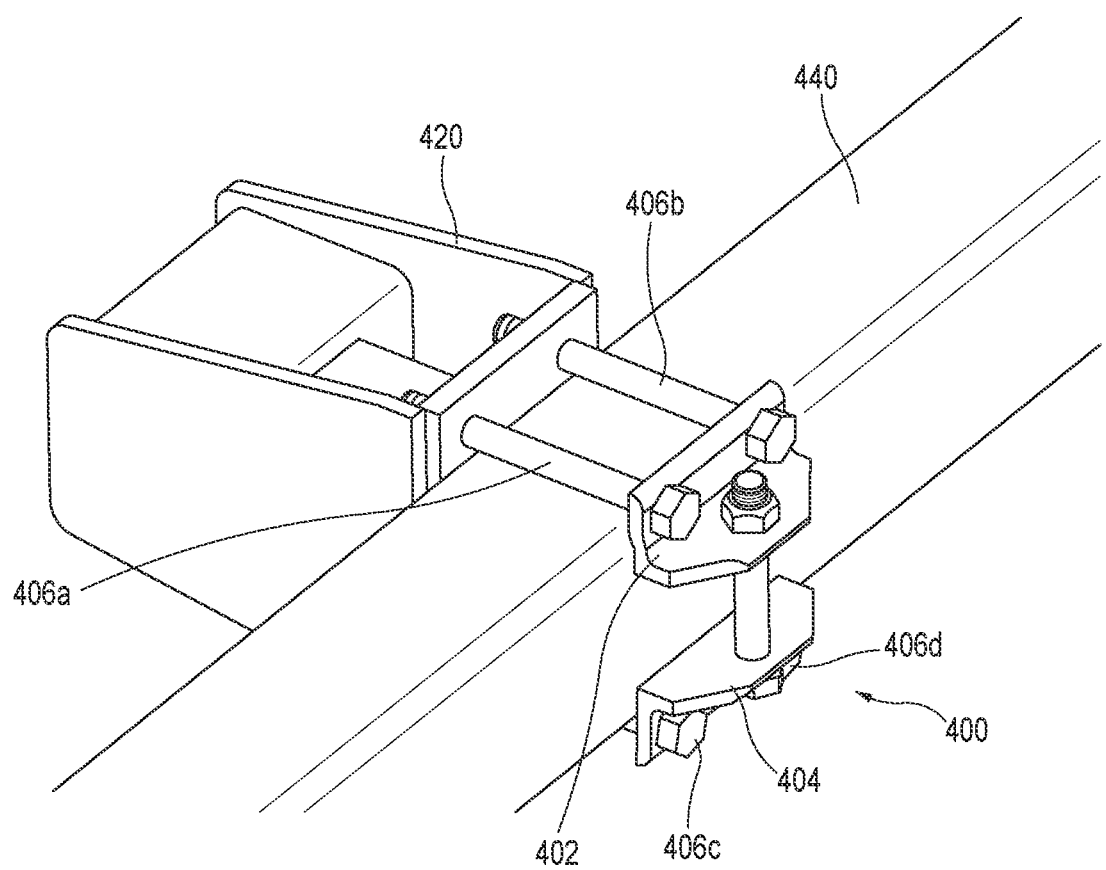
FIG. 4 is a perspective view of a device for mounting a component to a mounting element.

FIG. 4 illustrates another clamp 400 and a bracket 420 according to another design concept. This design concept includes ends 402 and 404 with formed back angles and mounting bolts 406a-d. The ends 402 and 404 with the formed back angle reduce the clearances of the mounting bolt 406a-d and allow for easy assembly. Using these mounting components in place of the U-bolts discussed above eliminates the sharp corners and clearances that are normally associated with a U-bolt clamp. This type of mounting is still prone to movement because of the inherent deflection that is associated with an open section angle and the clearances that result when mounting the corner of an angle to the radius of a tube. The resulting deflection causes loss of torque of the mounting components, thus allowing components to move. This mounting arrangement also requires additional clearance with the back angle and other frame components, thus causing restrictions on the placement and position of these components.

Figure 5:
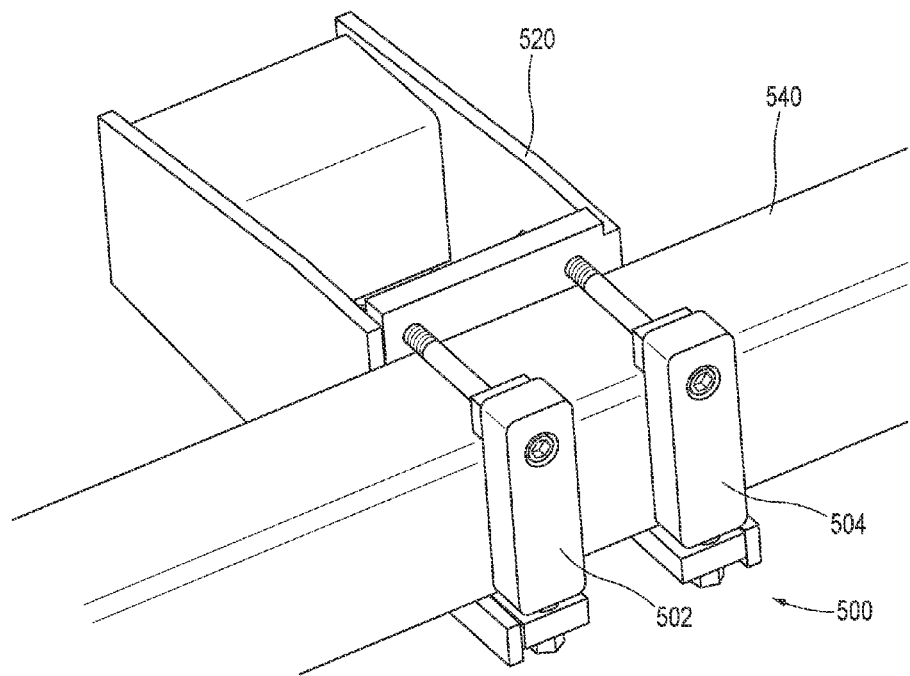
FIG. 5 is a perspective view of a device for mounting a component to a mounting element.

FIG. 5 illustrates a clamp 500 and bracket 520 according to another design concept. This design concept includes heavy fabricated (2-piece-welded) back plates 502 and 504 with (thread) tapped bottom hole for hardware mounting. The two-piece welded clamp 502 or 504 forms one side of the clamp, and the back plates 502 and 504 are designed to grip the mounting tube 540 on two sides and eliminate clearances at that corner. This design also requires the use of shim plates and specific procedures for installation, in order for all components to assemble and fit properly. Due to all the close tolerances that are required and normal variations from manufacturing procedures for a clamp of this type to properly fit, the assembly process for this clamp can be tedious and time consuming. If there is a requirement that clearances be removed around all sides of the mounting tube 540, the procedure to properly mount requires an initial assembly to check for clearances and measure component gaps. After this initial assembly and measurement, the mounting hardware is removed and shims are added (to eliminate all remaining gaps) and the hardware is then re-installed. Another requirement of this design is proper torque sequence must be followed for proper fit to mounting frame.

Figure 6A:
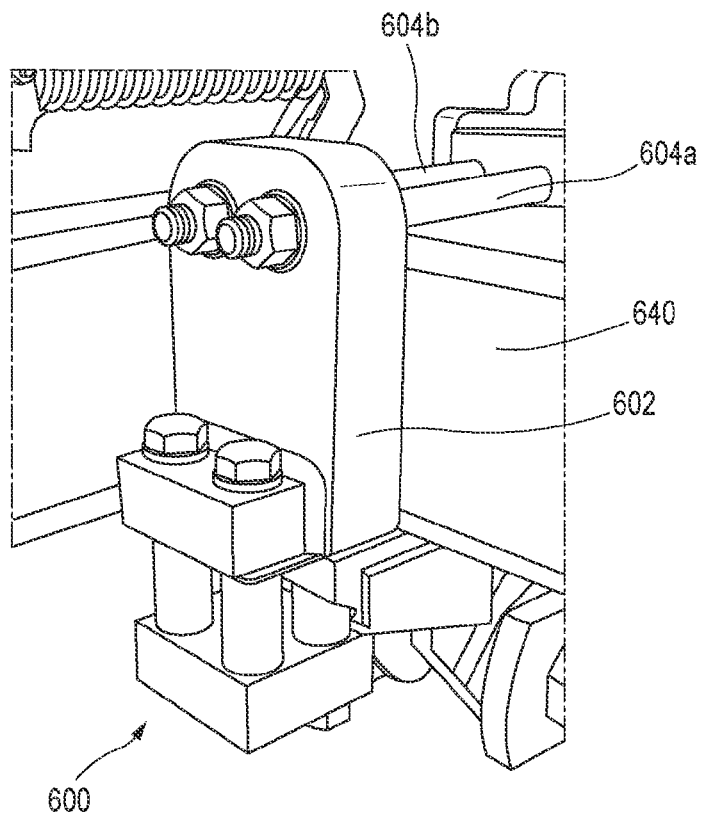
FIGS. 6a and 6b are perspective views of a device for mounting a component to a mounting element.
Figure 6B:
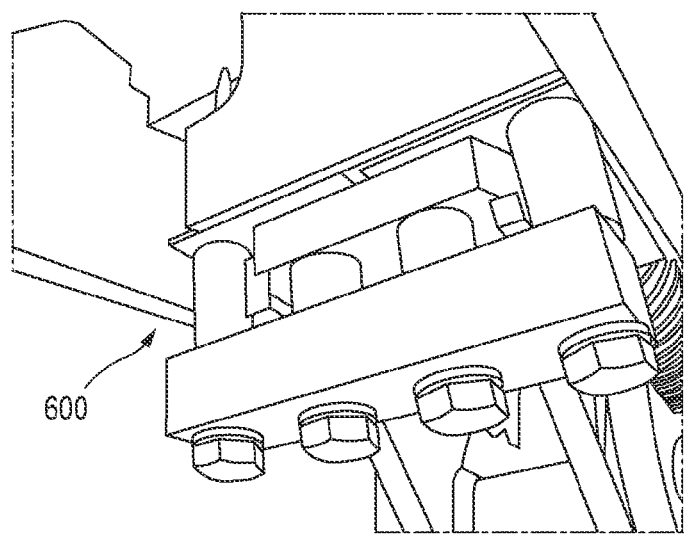

FIGS. 6a and 6b illustrate a clamp 600 for mounting a bracket according to another design concept. The design concept in FIGS. 6a and 6b is a variation of the clamp design concept illustrated in FIG. 5, except it involves adding additional hardware to increase the obtainable clamp load. This clamp variation is used where space limitation is not a factor. The design concept illustrated in FIGS. 6a and 6b requires the use of shims and a heavy back plate 602 designed to firmly grip the mounting tube 640 on one side. When these clamps are properly secured, they will partially deform the adjacent mounting bolts 604a-b, thus eliminating the clearance normally present with earlier clamp designs. The process of adding shims and proper torque of the hardware is still required when this clamp design is utilized. These types of clamps are very tedious and time consuming to install because of the two procedure requirements.

Figure 1:
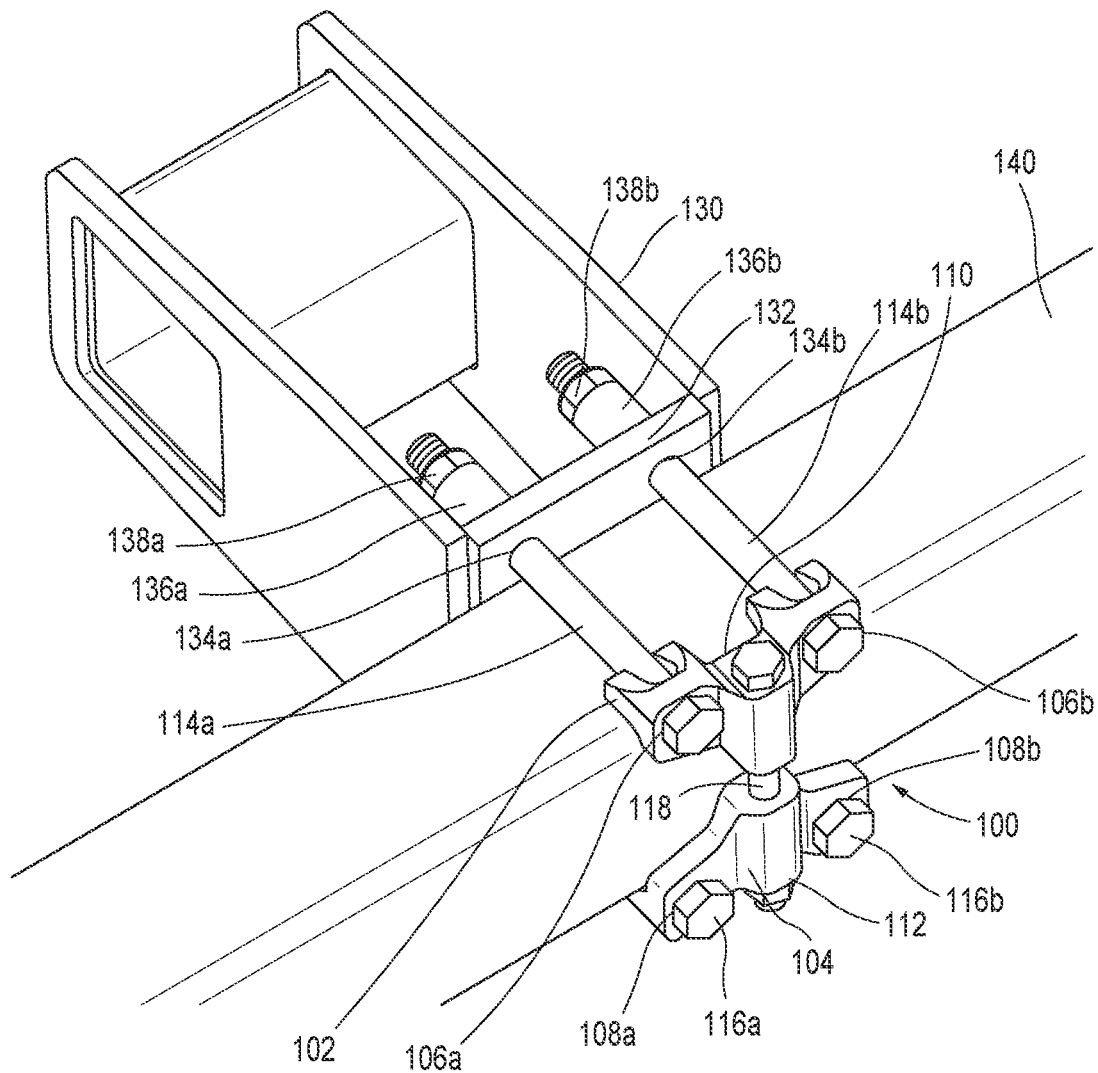
FIG. 1 is a perspective view of an assembled cast back clamp and mounting component mounted on a mounting element according to an embodiment of the present invention.
Figure 2:
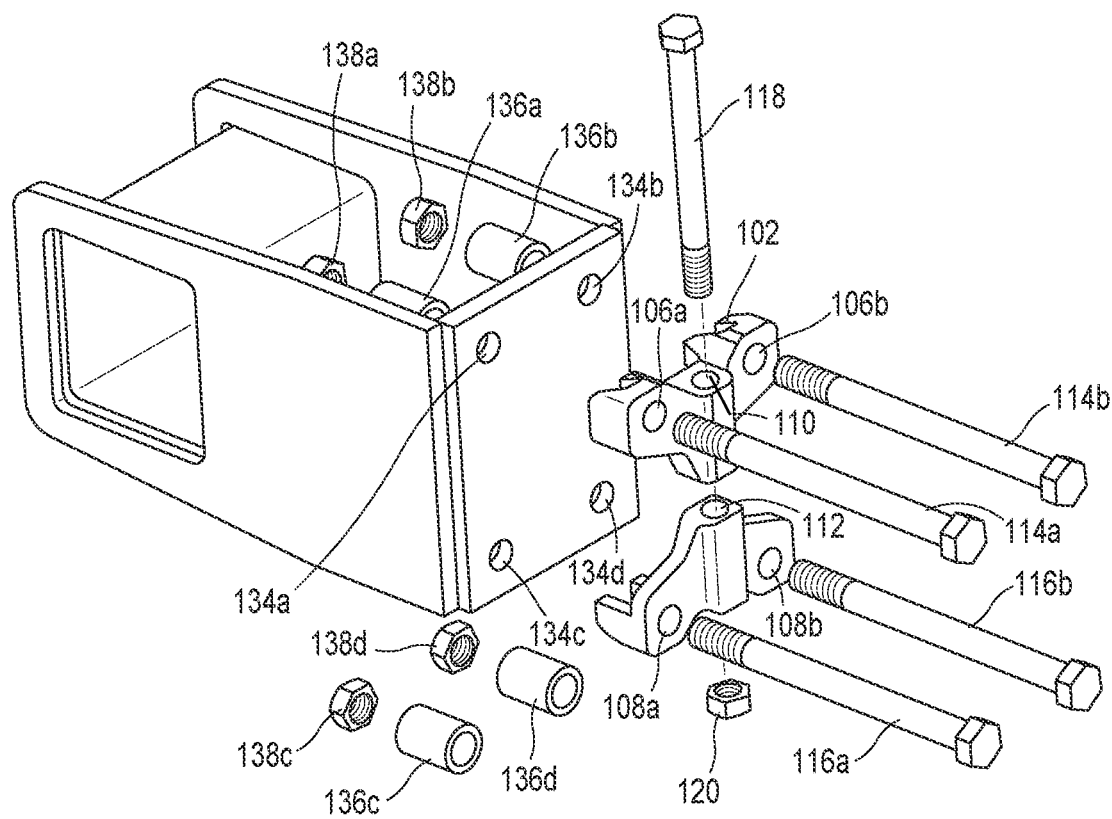
FIG. 2 is a perspective view of an exploded cast back clamp and mounting component according to an embodiment of the present invention.

FIGS. 1 and 2 illustrate a clamp according to an embodiment of the present invention, for mounting a component, such as a bracket, to a mounting element or tube, such as a frame member. The clamp is adjustable in length, and it is has a structure that matches the profile of a mounting element. The length of the clamp can be adjusted so as to allow the clamp to match mounting elements of various sizes. Further, the adjustability of the length of the clamp allows for it to firmly mate to the mounting element. The clamp can be coupled to a bracket, which firmly mounts the bracket to the mounting element.

As shown in FIGS. 1 and 2, the clamp includes ends with inner angles configured to match the mounting element. The design of the ends allows the ends to fully contact the mounting element at all mating surfaces, which eliminates bending and deflection of the clamp components. The length of the clamp can be adjusted to change the distance between the ends. Mounting members can couple the clamp to the bracket. The clamp is configured to allow the mounting members to set firmly against the mounting element in a coupled position.

Referring now to FIG. 1, which is a perspective view of an assembled cast back clamp and mounting component mounted on a mounting element or frame member, according to an embodiment of the present invention. The clamp 100 is configured to mount a component or bracket 130 to a mounting element 140, such as a frame member. The clamp 100 is configured to couple with the bracket 130, which causes the bracket 130 to be mounted on the mounting element 140. The clamp 100 includes end pieces 102 and 104 configured to clamp down upon a mounting element 140. The distance between the end pieces 102 and 104 of the clamp can be adjusted to allow the end pieces 102 and 104 to couple with mounting elements 140 of various sizes. Each end piece 102 and 104 is configured, or shaped, to match the profile of the mounting element 140, which eliminates bending and deflection of the clamp components. According to an embodiment of the present invention, the cross section of the mounting element 140 can be approximately rectangular shaped with four side surfaces. According to an embodiment of the present invention, the inner angle of each end 102 and 104 can be approximately 90 degrees or less.

Each end piece 102 and 104 can be coupled with the bracket 130. Each end piece 102 and 104 is configured to receive a mounting member 114a-b and 116a-b that can couple the end piece 102 and 104 to the bracket 130. In an embodiment of the present invention, each end piece 102 and 104 includes at least one mounting hole 106a-b and 108a-b. Each mounting hole 106a-b and 108a-b is configured to receive a mounting member 114a-b and 116a-b.

In an embodiment of the present invention, the bracket 130 and each end piece 102 and 104 can be configured to allow the mounting members 114a-b and 116a-b to contact the entire mounting element 140 surface between the clamp 100 and the bracket 130. This causes the mounting members 114a-b and 116a-b to act as a wedge onto the mounting element 140, which eliminates clearances that are normally associated with mounting clamps. In an embodiment of the present invention, the portion of the end pieces 102 and 104 through which the mounting members 114a-b and 116a-b pass in an assembled configuration includes spaces that match the mounting holes 106a-b and 108a-b such that, when the mounting holes 106a-b and 108a-b receive the mounting members 114a-b and 116a-b, the surface of the mounting members 114a-b and 116a-b can contact the surface of the mounting element 140.

The distance between the end pieces 102 and 104 can be adjusted. An adjustable means 118 for adjusting the distance between the end pieces 102 and 104 can be provided. In an embodiment of the present invention, a retaining member 118 spans between the end pieces 102 and 104, and the end pieces 102 and 104 can move parallel to the longitudinal axis of the retaining member 118. The position of the end pieces 102 and 104 on the retaining member 118 can be adjusted so as to adjust the distance between the end pieces 102 and 104.

In an embodiment of the present invention, each end piece 102 and 104 includes a retaining hole 110 and 112 configured to receive a retaining member 118. The retaining hole 110 at a first end piece 102 is configured to align with the retaining hole 112 of a second end 104, such that the retaining member 118 can be received simultaneously by both retaining holes 110 and 112 when the clamp 100 is in assembled position. In an embodiment of the present invention, the end pieces 102 and 104 can slidably move along retaining member 118 when the retaining member 118 is received by the retaining holes 110 and 112. In an embodiment of the present invention, the distance between the end pieces 102 and 104 can be adjusted by adjusting the position of the end pieces 102 and 104 on the retaining member 118.

In an embodiment of the present invention, the retaining member 118 is a nut and bolt including a head at an end, a threaded portion at an opposite end, and a nut 120 configured to couple with the threaded portion. The nut 120 can be coupled to the threaded portion at a plurality of positions, and can be used, along with the head of the retaining member 118, to set a maximal distance between the end pieces 102 and 104. The nut 120 can be tightened when the clamp 100 is clamped onto a mounting element 140 to firmly mate the end pieces 102 and 104 to the mounting element 140.

The bracket 130 can include a base plate 132 and a plurality of mounting holes 134a-d. The mounting holes 134a-d are configured to match the mounting element 140, i.e., the distance between the bottom of the upper mounting holes 134a-b and the top of the lower mounting holes 134c-d will be approximately the length of the side of the mounting element 140. The mounting holes 134a-d are positioned such that the mounting members 114a-b and 116a-b contact approximately the entire length of a surface of the mounting element 140 between the clamp 100 and the bracket 130 in a mounted position.

In an embodiment of the present invention, the mounting members 114a-b and 116a-b are configured such that the full body diameter of the mounting member 114a-b and 116a-b can extend fully through the base plate 132, i.e., any portion of the member with reduced diameter, such as a threaded portion, starts after the base plate 132 of the bracket. This eliminates the inherent weakness associated with a member when a bending load is applied to an area of reduced diameter, such as a threaded portion. In an embodiment of the present invention, the mounting members 114a-b and 116a-b include spacers 136a-d and nuts 138a-d configured to couple with the portions of the mounting members 114a-b and 116a-b that extend beyond the base plate 132. The spacers 136a-d and the nuts 138a-d are configured to maintain the mounting members 114a-b and 116a-b firmly coupled to the bracket 130 and the clamp 100.

FIG. 2 illustrates an exploded view of the clamp 100 and bracket 130 according to an embodiment of the present invention. The exploded view shows all of the mounting holes 134a-d of the bracket 130 and all of the spacers 136a-d and 138a-d. The components illustrated in the exploded view are the same components illustrated in FIG. 1.

FIG. 2 illustrates the mounting members 114a-b and 116a-b, spacers 136a-d and nuts 138a-d according to an embodiment of the present invention. The mounting members 114a-b and 116a-b include a head portion, a body portion and a threaded portion. The thread portion has a diameter less than the diameter of the body portion. As discussed above, each mounting members 114a-b and 116a-b is configured such that the full body, i.e., the body portion, extends through the base plate 132 of the bracket. The length of the body portion, i.e., the distance between the head portion and the threaded portion, must be at least long enough to allow the body portion to extend through the base plate when used to mount the bracket 130 on a mounting element 140. Each spacer 136a-d is configured to receive a mounting member 114a-b and 116a-b, and is long enough to extend from the base plate 132 of the bracket to the threaded portion of the mounting member 114a-b and 116a-b. Each nut 138a-d is configured to couple with the threaded portion of a mounting member 114a-b and 116a-b.

In an embodiment of the present invention, the retaining member 118 includes a head, a body and a threaded portion. A nut 120 is configured to couple with the threaded portion of the retaining member 118. The retaining member 118 is configured to engage each of the retaining holes 110 and 112 of the end pieces 102 and 104 of the clamp. When the retaining member 118 engages both of the retaining holes 110 and 112, the maximal distance between the end pieces 102 and 104 can be adjusted by adjusting the position of the nut 120. In another embodiment of the present invention, a spacer configured to receive the retaining member 118 can be positioned between the nut 120 and the end portion 104, and the nut 120 and the spacer can be used in conjunction with the to set a maximal distance between the end pieces 102 and 104.

Thus, a number of preferred embodiments have been fully described above with references to the drawing figures. Although the invention has been described based upon these preferred embodiments, it would be apparent to those of skill in the art that certain modifications, variations, and alternative constructions could be made to the described embodiments within the spirit and scope of the invention. For example, the retaining member could include a shaft collar instead of a threaded portion and a nut.

We claim:

1. A mounting device for mounting a component onto a farm implement having a frame, comprising:
   a clamp member including a top section, a bottom section and a connecting member coupled to said top section at a first end portion and said bottom section at a second end portion,
   wherein said top section is configured to engage two adjacent surfaces of a support element, and said bottom section is configured to engage two adjacent surfaces of a support element,
   wherein a length of said connecting member between said top section of said clamp member and said bottom section of said clamp member is adjustable,
   wherein said top section includes at least one receiving member oriented approximately orthogonal to said connecting member, and said bottom section includes at least one receiving member oriented approximately orthogonal to said connecting member;
   a mounting component including a plurality of receiving members; and
   a plurality of mounting members, wherein each mounting member is configured to engage said at least one receiving member of said top section or said at least one receiving member of said bottom section and one of said plurality of receiving members of said mounting component such that each of said plurality of mounting members are positioned orthogonal to said connecting member when engaged.

2. The mounting device of claim 1, wherein said top section of said clamp member and said bottom section of said clamp member each include a retaining receiving member.

3. The mounting device of claim 2, wherein said connecting member is configured to engage said retaining receiving members.

4. The mounting device of claim 3, wherein said top section of said clamp member and said bottom section of said clamp member are each capable of being coupled to said connecting member at a plurality of locations on said connecting member such that a distance between said top section and said bottom section is adjustable.

5. The mounting device of claim 1, wherein said receiving members of said top section and said bottom section of said clamp member are configured to allow said mounting members to contact a surface of a support member.

6. The mounting device of claim 1, wherein each of said top section and bottom section of said clamp member is approximately L-shaped.

7. The mounting device of claim 1, wherein each of said plurality of receiving members of said mounting component is a hole.

8. The mounting device of claim 1, wherein each mounting member includes a head, a body portion, and a threaded portion, and each mounting member is configured to engage said at least one receiving member of said top section or said at least one receiving member of said bottom section and one of said plurality of receiving members of the mounting component with the body.

9. The mounting device of claim 1, wherein said top section includes at least one opening extending from said at least one receiving member configured to allow said mounting members to contact a top surface of the support member, and said bottom section includes at least one opening extending from said at least one receiving member configured to allow said mounting members to contact a bottom surface of the support member.

10. A mounting device mounting a bracket to a support member, comprising:
    a clamp including two L-shaped end portions and a connecting member coupling said end portions, each L-shaped end portion including an inner angle coupled to the support member, and each of said end portions includes at least one receiving member, wherein a length of said clamp is adjustable;
    a mounting component including a plurality of mounting receiving members; and
    a plurality of mounting members coupling said clamp to said mounting component, wherein each mounting member is configured to engage a receiving member of said clamp and a mounting receiving member of said mounting component and each mounting member is positioned approximately orthogonal to said connecting member when engaged.

11. The mounting device of claim 10, wherein each of said clamp end portions include a retaining hole.

12. The mounting device of claim 11, wherein said connecting member is a retaining member configured to engage said retaining holes and couple said at least two clamp end portions together.

13. The mounting device of claim 12, wherein said clamp end portions are capable of being coupled to said retaining member at a plurality of locations on said retaining member such that a distance between said end portions is adjustable.

14. The mounting device of claim 10, wherein each L-shaped end portion includes at least one opening on said inner angle extending from said receiving members of said clamp configured to allow said mounting members to contact a surface of a support member.

15. The mounting device of claim 10, wherein each of said clamp end portions are configured to couple with two adjacent surfaces of said support member.

16. A system for mounting a component to a support member with at least three surfaces, comprising:
- means for clamping configured to couple with three surfaces of said support member;
- means for adjusting a length of said means for clamping;
- means for mounting a component; and
- means for coupling said means for clamping to said means for mounting a component.

17. A system according to claim 16, wherein said means for clamping includes two ends and a means for coupling said two ends.

18. A system according to claim 17, further comprising a means for adjusting a length of said means for coupling said two ends.

* * * * *